(12) United States Patent
Harro et al.

(10) Patent No.: US 11,740,383 B1
(45) Date of Patent: Aug. 29, 2023

(54) TIME DOMAIN REFLECTOMETRY SYSTEM FOR SUBSURFACE MOVEMENT DETECTION

(71) Applicants: David Bruce Harro, Odessa, FL (US); Thomas Arthur Nies, Hudson, FL (US)

(72) Inventors: David Bruce Harro, Odessa, FL (US); Thomas Arthur Nies, Hudson, FL (US)

(*) Notice: Subject to any disclaimer, the term of this patent is extended or adjusted under 35 U.S.C. 154(b) by 79 days.

(21) Appl. No.: 17/500,037

(22) Filed: Oct. 13, 2021

Related U.S. Application Data

(60) Provisional application No. 63/093,210, filed on Oct. 17, 2020.

(51) Int. Cl.
*G01V 9/00* (2006.01)
*G01V 1/00* (2006.01)

(52) U.S. Cl.
CPC ............... *G01V 9/00* (2013.01); *G01V 1/008* (2013.01)

(58) Field of Classification Search
CPC ...... G01V 9/00; G01V 1/008; G01B 2210/66; G06F 3/03; E21B 17/023; E21B 23/004; E21B 23/01; E21B 23/04115; F01B 11/007; Y10S 16/10; Y10S 411/913; Y10T 74/2045
See application file for complete search history.

(56) References Cited

U.S. PATENT DOCUMENTS

| | | | |
|---|---|---|---|
| 3,828,435 A * | 8/1974 | Baker ................... | E21F 17/185 33/700 |
| 4,094,189 A * | 6/1978 | Serata ................... | E21F 17/185 73/779 |
| 7,060,917 B1 * | 6/2006 | Park ....................... | H01H 13/52 200/520 |
| 2007/0204686 A1 * | 9/2007 | Solis ....................... | E21B 47/04 73/152.45 |
| 2012/0229623 A1 * | 9/2012 | Hsieh ....................... | G01V 9/02 348/135 |

FOREIGN PATENT DOCUMENTS

JP H061620 Y2 * 1/1994

* cited by examiner

*Primary Examiner* — Daniel R Miller
*Assistant Examiner* — Eric Sebastian Von Wald
(74) *Attorney, Agent, or Firm* — Gulf Coast Intellectual Property Group

(57) ABSTRACT

A geological subsurface movement detection system that is configured to provide detection of movement in a subsurface area so as to provide data regarding issues such as but not limited to sinkhole development. The present invention includes an implant sensor assembly that is placed within a casing that has been installed in a bored hole in the ground. The implant sensor assembly includes a switch housing that is operably coupled to a contact member wherein the contact member is operably coupled utilizing a spring member. The switch housing includes a first switch and a second switch disposed in the interior volume that are electrically coupled on a circuit. A signal generator is operably coupled to the implant sensor assembly via a wire and is operable to send a pulse electrical signal thereon. A computing device is operably coupled to the signal generator and is operable to collect signal profile data.

6 Claims, 4 Drawing Sheets

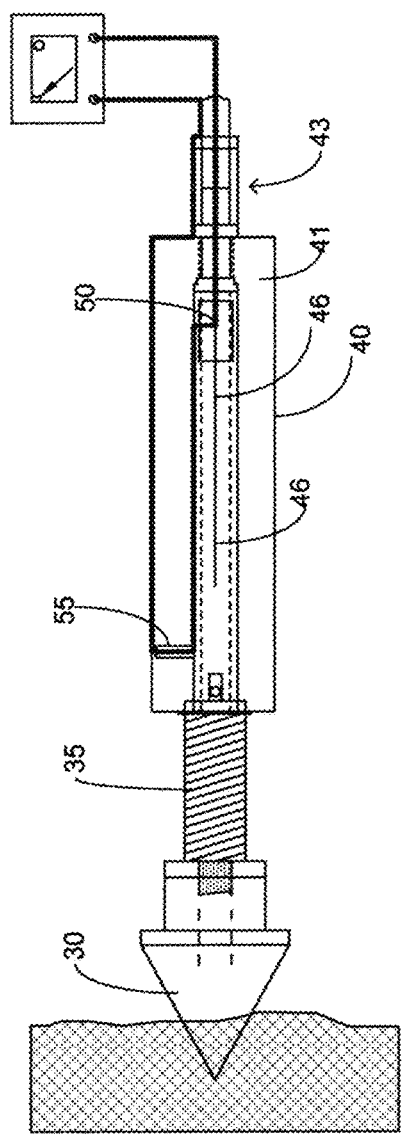
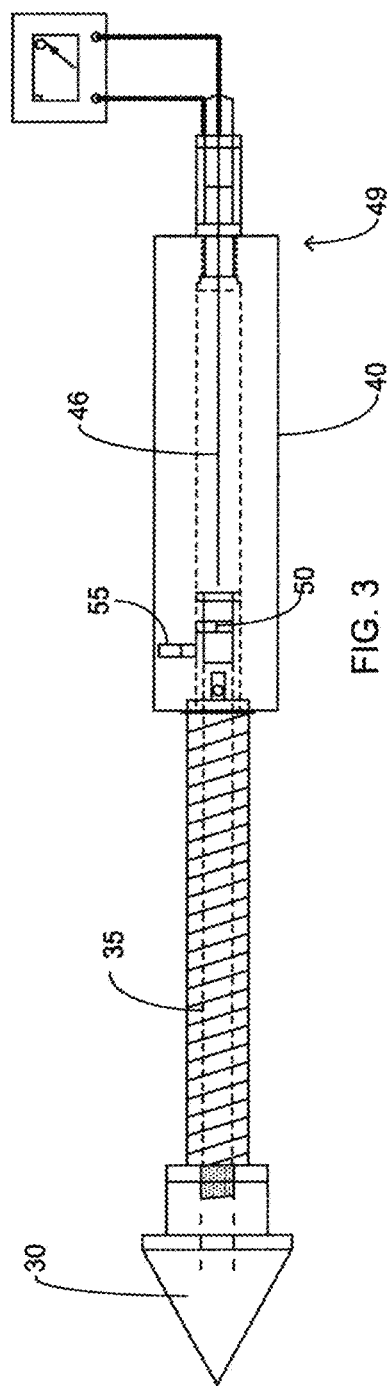
FIG. 2
FIG. 3

TIME DOMAIN REFLECTROMETRY SYSTEM FOR SUBSURFACE MOVEMENT DETECTION

PRIORITY UNDER 35 U.S.C SECTION 119(e) & 37 C.F.R. SECTION 1.78

This nonprovisional application claims priority based upon the following prior U.S. Provisional Patent entitled: Time Domain Reflectrometry System for Subsurface Movement Detection Application No.: 63/093,210 filed Oct. 17, 2020, in the name of David B. Harro and Thomas A. Nies, which is hereby incorporated by reference for all purposes.

FIELD OF THE INVENTION

The present invention relates generally to subsurface movement detection, more specifically but not by way of limitation, a system operable to utilize an electrical displacement sensors that is implanted into the subsurface for the purpose of detecting ground movement to depth of up and over 100 feet in unconsolidated materials. More specifically, the method of the present invention utilizes time domain reflectometry (TDR) measurements of the implanted electrical displacement sensors to detect subsurface movement associated with geologic hazardous such as but not limited to landslides, earthquakes and sinkholes.

BACKGROUND

Time Domain Reflectometry (TDR) was first developed in the 1950's to locate and identify faults in cables. TDR works by sending a pulse down the cable at the wavelength in nanoseconds the speed typical of radar. TDR is sometimes called cable radar, where a pulse sent down the cable to the end and then it returns, if a reflector is seen in the cable between the ends this will typically indicate that the cable will have some type of break or significant distortion that results in an impedance mismatch. In the 1970's TDR technology began to be applied geotechnical applications which lead to the ability to record measurements of deformation in rock slopes that corresponded to deformation in TDR buried cables. TDR has routinely been employed by Federal Highway Administration and numerous Departments of Transportation in the US and aboard to monitor the potential for landslide. From the initial use of TDR to monitor mass wasting events TDR technology has been successfully employed for monitoring landslides, and large scale subsidence from underground mines and sinkholes.

The fundamentals of typical TDR system for monitoring ground deformations consist of coaxial cable that is placed either in the center of a borehole using a drill casing or is trenched horizontally and is backfilled with grout that cannot be mobilized unless acted upon by significant force. The cable is then connected to a cable tester which pulses and measures the TDR or electrical signal. The combination of the orientation and monitoring location and cable tester produce a system that can detect discontinuities in the electrical cables due to ground movement. The cable is installed as to intersect potential slip, shearing or raveling surfaces associated with ground movements. The discontinuities at depth can be determined by the TDR signal return producing a reflector at the location shearing of the grout and coaxial cable creating an impedance mismatch. The reflector then is related to the ground movement at the location of the discontinuities. The TDR signal will indicate changes compared to the initial base line measurements, allowing the determination of depth, progression and general scale of movement. In this type of TDR application where the coaxial cable is grouted either vertically in boreholes or horizontally in trenches, the force of the movements in the earth required to facture the grout and cause distortion in the coaxial cable is significant. Thus the sensitivity of this type of TDR application to low energy environments is low and the threshold of force required to create a response is high. For lower energy ground movements the sensitivity of a TDR system must be considerably higher because the threshold of the force applied to the material is lower. Ground movements in unconsolidated sediments are considered to have much lower force as these sediments can move as individual grains or act as a fluid mass. For engineering applications unconsolidated sediments with potential to have ground movements to depths of over 100 feet are challenging.

Sinkhole development has been documented very well in one of the most notable references USGS publication Sinkholes, West-Central Florida produced by Ann Tihnasky of the USGS. In this publication three types of sinkhole formation occurring in the natural formations of limestone found in Florida. The three types are dissolution, cover-subsidence and cover-collapse. Dissolution is the erosion of the upper limestone surface , typically where the limestone is near the surface. Cover-subsidence develop gradually where the covering sediments over time migrate into hole, cracks in the limestone, cover-collapse develop abruptly and cause catastrophic damages. These types of sinkhole develop where appreciable amounts of clay allow the formation of voids, until the clay cover become too thin to support the overlying weight. Of the three the cover-collapse is the most dramatic and due to the sudden collapse creating visual holes in the earth's surface. However, the standard TDR methodology is not sensitive to lower energy ground subsidence events that can occur in unconsolidated soils or sediments.

Accordingly, there is a need for a new approach to measure low energy ground movements at depths in unconsolidated soils or sediments in order to predict potential issues such as but not limited to sinkholes.

SUMMARY OF THE INVENTION

It is the object of the present invention to provide a time domain reflectrometry apparatus and method that is operable to detect subsurface ground movement wherein the system of the present invention consists of a TDR implant sensor, a casing and a locking apparatus having a method of use for installation of the coaxial cable and implant sensors into the subsurface of unconsolidated sediments to depths of over 100 feet.

Another object of the present invention is to provide a system operable to detect subsurface ground movement in unconsolidated soils or sediment wherein the implant sensor is constructed of machined aluminum housing, which a coaxial cable is centrally disposed and is operably coupled to a displacement switch that is operably coupled to a spring compression loaded metal.

A further object of the present invention is to provide a time domain reflectrometry apparatus and method that is operable to detect subsurface ground movement wherein method utilizes an implant that is installed beneath the subsurface directly through the steel drill casing to the selected depth.

Still another object of the present invention is to provide a system operable to detect subsurface ground movement in unconsolidated soils or sediment wherein the permanent outer casing in a preferred embodiment is constructed of PVC and is lowered to the location of the end of the drill casing.

An additional object of the present invention is to provide a time domain reflectrometry apparatus and method that is operable to detect subsurface ground movement wherein the coaxial cable and implant sensor are attached to smaller diameter inner casing and are centered to the outer casing.

Yet a further object of the present invention is to provide a system operable to detect subsurface ground movement in unconsolidated soils or sediment wherein the drill casing is back filled with silica sand in the angular space between the drill casing and the outer casing while maintaining an opening for the coaxial cable and implant sensor inner casing inside the outer casing.

Another object of the present invention is to provide a time domain reflectrometry apparatus and method that is operable to detect subsurface ground movement wherein the housing is attached to the metal point by the hole for the insertion of BNC cable splice adapter that is drilled in the top of the implant sensor.

Still an additional object of the present invention is to provide a system operable to detect subsurface ground movement in unconsolidated soils or sediment wherein the implant sensor is arranged terminating at a point at or near the location of anticipated ground movement.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 2 is a diagrammatic view of the present invention with the signal switch in a closed position; and FIG. 3 is a diagrammatic view of the present invention with the signal switch in an open position.

DETAILED DESCRIPTION

Figure 1:
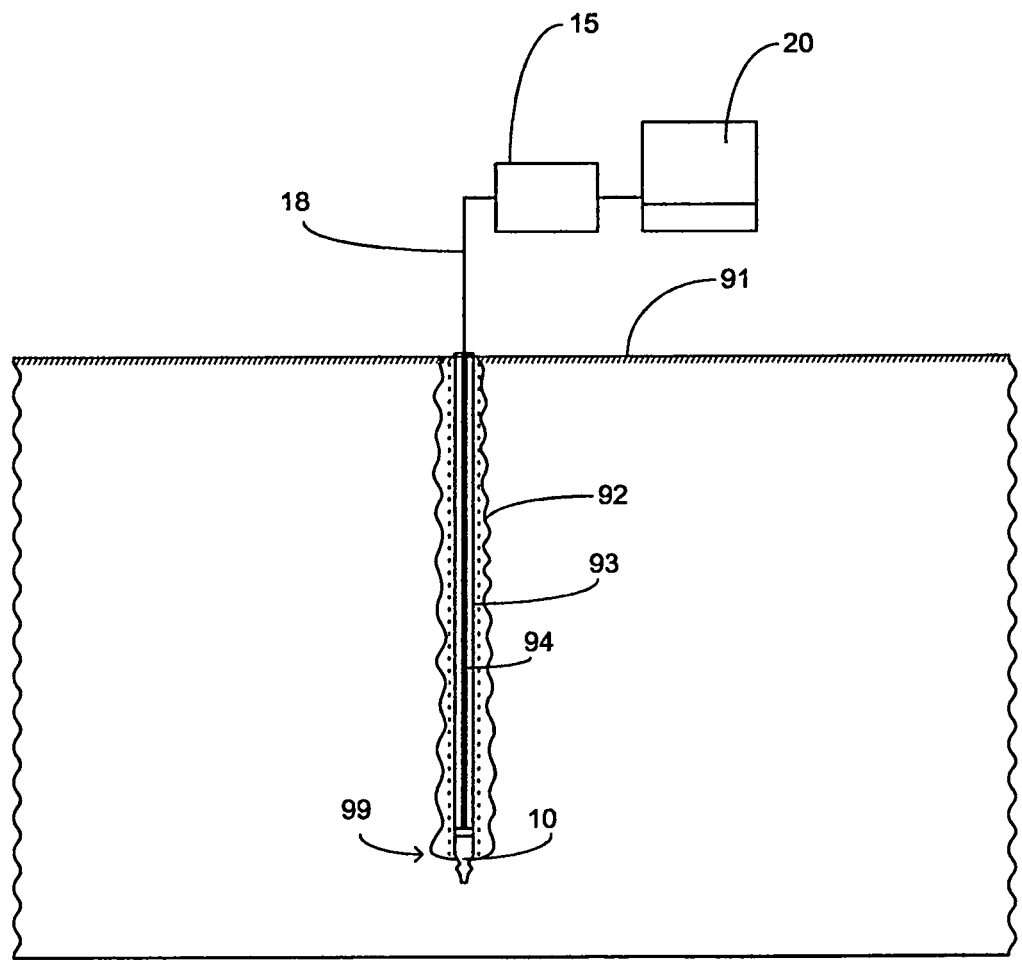
FIG. 1 is a diagrammatic view of an installation of the present invention.
Figure 4:
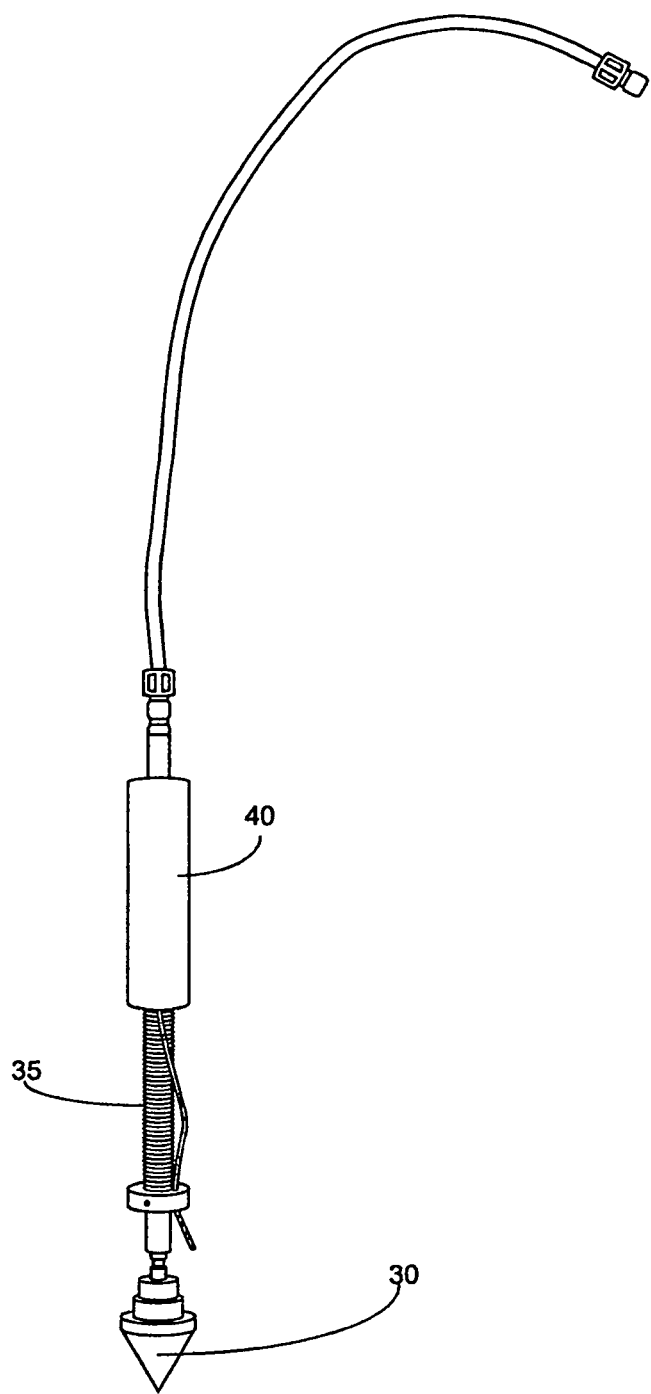
FIG. 4 is a perspective view of the implant senor assembly of the present invention.

Referring now to the drawings submitted herewith, wherein various elements depicted therein are not necessarily drawn to scale and wherein through the views and figures like elements are referenced with identical reference numerals, there is illustrated reflectrometry system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to Figures submitted as a part hereof, the reflectrometry system 100 includes an implant sensor assembly 10 wherein the implant sensor assembly 10 is configured to be inserted into the ground at a desired depth in order to detect subsequent movements of the ground proximate thereto. FIG. 1 submitted herewith illustrates the technique and elements utilized in a deployment of the present invention. The surface 91 of the ground has a bore hole 92 formed therein utilized suitable equipment and/or technology. It should be understood within the scope of the present invention that the bore hole 92 could be formed utilizing techniques such as but not limited to drilling. An outer casing 93 and inner casing 94 are disposed within the bore hole 93 and extend substantially the length thereof. The implant sensor assembly 10 is placed at the lower end 99 of the bore hole 93 so as to be positioned in order to detect ground movement as will be further discussed herein. It should be understood within the scope of the present invention that the bore hole 93 and as such the placement of the implant sensor assembly 10 could be performed at various depths. The implant sensor assembly 10 is operably coupled to a signal generator 15 via cable 18. It should be understood within the scope of the present invention that the cable 18 is a conventional coaxial cable. Furthermore, it should be understood within the scope of the present invention that the signal generator 15 is a conventional time domain reflectrometry signal generator capable of producing the necessary electrical signals to operate the implant sensor assembly 10. The signal generator 15 is operably coupled to a computing device 20 wherein the computing device 20 is configured to provide operational control of the signal generator 15 and provide collection of the data produced therefrom.

Illustrated herein in FIG. 2 and FIG. 3 is the implant sensor assembly 10 in its first position and second position.

The implant sensor assembly 10 includes a contact member 30 wherein the contact member 30 has a conical shaped end and is operable to be partially inserted into the ground at the lower end 99 of the bore hole 92. The contact member 30 in a preferred embodiment is manufactured from metal but it is contemplated within the scope of the present invention that the contact member 30 could be manufactured from other suitable materials. It should be further understood within the scope of the present invention that the contact member 30 could be provided in alternate shapes and sizes. The contact member 30 has operably coupled thereto a spring member 35. The spring member 35 is operably coupled to the contact member 30 utilizing suitable techniques. The spring member 35 has coupled thereto the switch housing 40 distal to the contact member 30. Spring member 35 is operable to provide movement of the switch housing 40 and is further discussed herein. It should be understood within the scope of the present invention that the spring member 35 could be provided in alternate sizes and tensile strengths. Additionally, while not particularly illustrated in the drawings submitted as a part hereof, it is contemplated within the scope of the present invention that a locking mechanism could be operably coupled with the spring 35 so as to maintain the spring in a compressed position during the installation process. It should be understood within the scope of the present invention that numerous types of locking elements could be employed.

The switch housing 40 is manufactured from an suitable durable material and is provided in a diameter so as to be able to be journaled into the inner casing 94. The switch housing 40 includes an interior volume 41 configured to house additional elements therein. It should be understood within the scope of the present invention that the switch housing 40 could be provided in alternate sizes. The switch housing 40 is operably coupled to cable 18 with coupler 43 present on the second end 49 of the switch housing 40. In a preferred embodiment the coupler 43 is a 3 Ghz splice adapter but it is contemplated within the scope of the present invention that the coupler 43 could be alternate types of connectors. Wire 46 is operably connected to coupler 43 and extends into the interior volume 41 of the switch housing 40. A first switch 50 and second switch 55 are electrically coupled in the first position of the switch housing 40 as illustrated herein in FIG. 2. In the first position of the switch housing 40, the second switch 55 is electrically coupled to wire 46 and as such the circuit between first switch 50 and second switch 55 is closed. The switch housing 40 is moved to its second position, illustrated herein in FIG. 3, wherein the movement to the second position is generated by the contact member 30 and spring member 35. If the ground with which the contact member 30 is engage shifts the spring member 35 facilitates movement of the switch housing 40 and as such transitions the switch housing 40 to its second position. In the second position, the first switch 50 is no longer electrically coupled with wire 46 and as such the circuit between the first switch 50 and second switch 55 is open. In the open position a disruption in a signal reflection produced by the signal generator 15 will be detected and as such provide an indication that the ground with which the contact member is engaged as moved. While no particular types of electrical switches for the first switch 50 and second switch 55 are required, it is desired within the scope of the present invention that ball nose plunger electric contacts be used for the first switch 50 and second switch 55. Additionally, it is further contemplated within the scope of the present invention that the wire 46 is manufactured from a stainless steel piano style wire.

Figure 5:
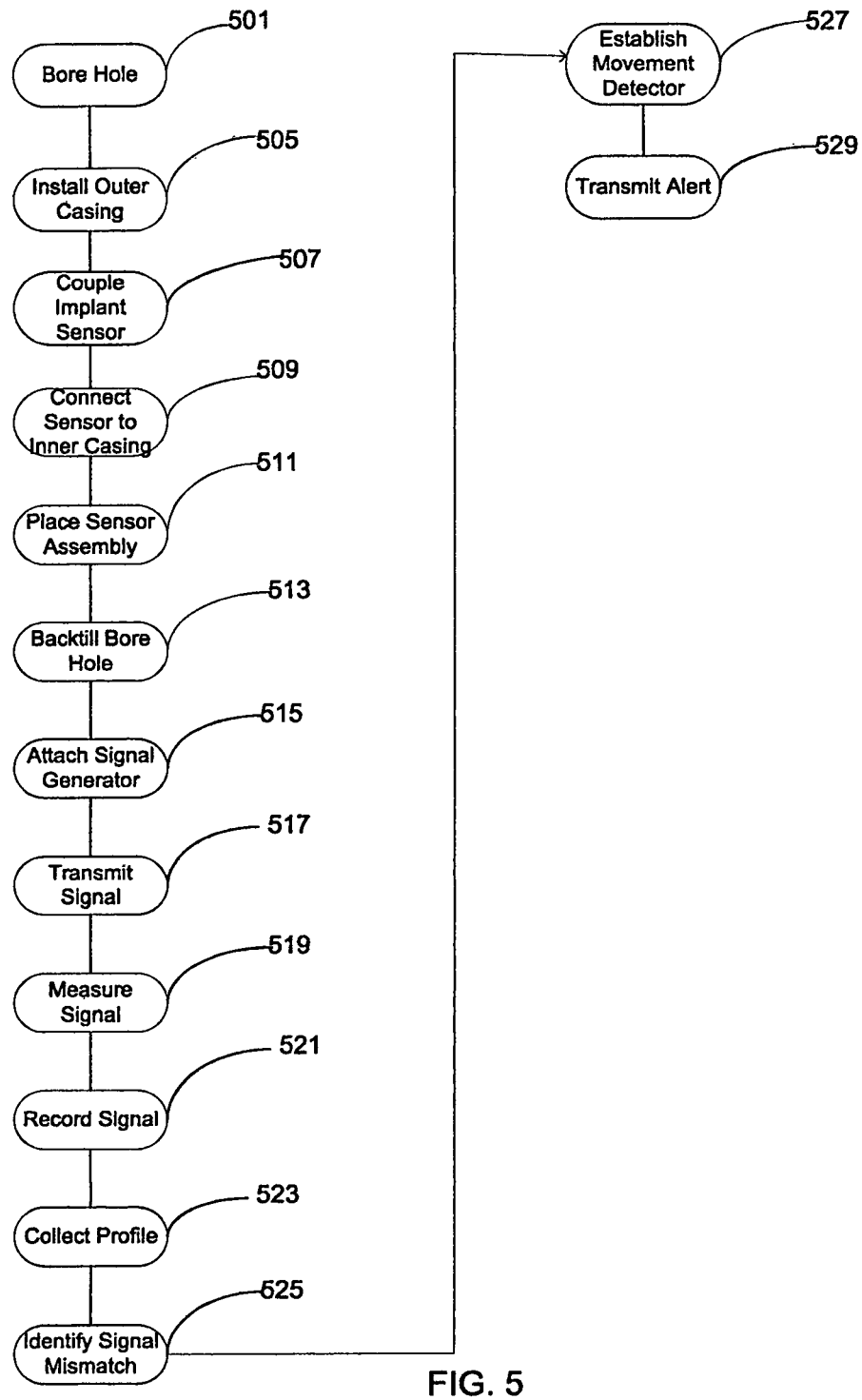
FIG. 5 is a outline of the method of the present invention.

Referring now to FIG. 5, a method of the present invention is outlined therein. In step 501, a bore hole 92 is formed utilizing suitable techniques. Step 505, ensuing formation of the bore hole 92, an outer casing is inserted into the bore hole 92 and is configured to extend substantially the length thereof. In step 507, the implant sensor assembly 10 is operably coupled to wire 18 wherein it is ensured that the wire 18 is of sufficient length so as to permit maintenance of the operable connection ensuing the placement of the implant sensor assembly 10 at the lower end 99 of the bore hole 92. Step 509, the inner casing 94 is placed within the outer casing and the implant sensor assembly 10 is placed within the passage of the inner casing 94. In step 511, the implant sensor assembly 10 is moved within the inner casing 94 so as to be placed proximate the lower end 99 of the bore hole 92. Step 513, if required, the bore hole 92 can be backfilled with a material such as but not limited to sand wherein the sand would be placed around the outer casing 93. In step 515, a signal generator 15 is operably coupled to wire 18. It should be understood within the scope of the present invention that the signal generator could be various types of suitable devices capable of producing a required electrical pulse signal.

In step 517, a signal is transmitted to the implant sensor assembly 10.

Step 519, the reflected signal is measured and subsequently recorded in step 521 utilizing the computing device 20. Subsequent recording the reflected signal, the subsequent termination, and the predetermined signal propagation speed factor, the computing device derives the cable length and any impedance mismatch due to movement of the contact member. In one embodiment, a reflection coefficient "P" is calculated using $P=Z_t-Z_o/Z_t-Z_o$, where $Z_o$ is the impedance of the transmission medium and $Z_t$ is the impedance of the termination at the far end of the transmission line. P which is simply 1 to −1 for open circuit and a value of zero means that there is no reflection . The data points are contained in a graph, which is a representation of the time in nano-seconds. As the data points profile is a model representation of cable and sensor in the subsurface, the resolution of the data points profile is greatly enhanced, especially by the techniques ability to resolve the distances to the location of the impedance accurately. From this enhanced resolution in the subsurface, the subsurface geologic target can more easily and accurately be detected at a deeper target depth than conventional methods used to determine ground movements. In step 523, a data signal profile is collected over a period of time wherein the collected profile establishes a baseline signal measurement for the implant sensor assembly 10 when the switch housing 40 is in its first position. Step 525, a signal mismatch is identified subsequent a signal transmission wherein the signal mismatch does not correlate with the collected signal profile and as such provides indication that the switch housing 40 has moved to its second position. In step 527, the user of the reflectometry system 100 establishes ground movement detection through analysis of the signal mismatch. Step 529, an alert is transmitted via the computing device 20 to entities that are monitoring for ground movement. It should be understood within the scope of the present invention that the computing device 20 includes software capable of providing automated control so as to execute functions such as but not limited to signal generation, identification of signal mismatch and transmission of an alert.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method of detecting geological subsurface movements using electrical signals wherein the method comprises the steps of:
    drilling at least one hole, wherein the at least one hole is drilled in a ground surface wherein it is desired to identify subsurface geological movement;
    installing a hole casing, wherein said hole casing is installed in the at least one hole;
    placing an inner casing, wherein an inner casing is journaled into a hollow passage of said hole casing, said inner casing having a diameter that is less than that of the outer casing,
    disposing an implant assembly into said inner casing, said implant assembly having a switch housing, said switch housing having a first end and a second end, said switch housing having an interior volume, said implant assembly having a contact member, said contact member being operably coupled to said first end of said switch housing, said contact member being operably coupled to said switch housing with a spring member, said switch housing movable between a first position and a second position;
    moving the implant assembly to a lower end of the at least one hole inside of said inner casing;
    attaching a signal generator, wherein attaching the signal generator comprises operably coupling the signal generator to said implant assembly utilizing a wire and operably coupling the signal generator to a computing device;
    transmitting a signal, wherein the signal generator transmits a signal through said wire;
    identifying a signal mismatch, wherein the signal is detected to have an impedance mismatch;
    establishing movement detection, wherein the signal mismatch is determined to have been caused by movement of the contact member and as such said switch housing has moved to said second position; and
    transmitting an alert, wherein said computing device transmits an alert to at least one entity that subsurface ground movement has occurred.

2. The method of detecting geological subsurface movements using electrical signals as recited in claim 1, and further including the step of collecting a profile, wherein a signal profile is collected by the computing device to determine a baseline signal for the implant assembly.

3. The method of detecting geological subsurface movements using electrical signals as recited in claim 2, wherein said switch housing further includes a first switch and a second switch, said first switch and said second switch being disposed in said interior volume of said switch housing, said first switch and said second switch being electrically coupled on a single circuit.

4. The method of detecting geological subsurface movements using electrical signals as recited in claim 3, wherein said switch housing further includes a wire centrally disposed within the interior volume thereof, said second switch being configured to operably couple to said wire in said first position of said switch housing.

5. The method of detecting geological subsurface movements using electrical signals as recited in claim 4, wherein the contact member is conical in shape.

6. The method of detecting geological subsurface movements using electrical signals as recited in claim 5, and further including the step calculating an impedance mismatch, said impedance mismatch due to movement of the contact member and placing said switch housing in said second position.

* * * * *